United States Patent
Shimizu et al.

(10) Patent No.: US 6,559,563 B1
(45) Date of Patent: May 6, 2003

(54) LINEAR OSCILLATING ACTUATOR

(75) Inventors: Hiroaki Shimizu, Hikone (JP); Ryo Motohashi, Hikone (JP); Hidekazu Yabuuchi, Hikone (JP); Takahiro Nishinaka, Ohmihachiman (JP); Noboru Kobayashi, Hikone (JP)

(73) Assignee: Matsushita Electric Works, Ltd., Kadoma (JP)

( * ) Notice: Subject to any disclaimer, the term of this patent is extended or adjusted under 35 U.S.C. 154(b) by 44 days.

(21) Appl. No.: 09/874,983

(22) Filed: Jun. 7, 2001

(30) Foreign Application Priority Data

Jun. 7, 2000 (JP) ........................................ 2000-171269
Jun. 7, 2000 (JP) ........................................ 2000-171271

(51) Int. Cl.⁷ ............................ H02K 1/06; B26B 19/02
(52) U.S. Cl. ...................... 310/12; 310/217; 310/254; 310/68; 30/43.92; 30/74
(58) Field of Search .......................... 310/12, 13, 14, 310/15

(56) References Cited

U.S. PATENT DOCUMENTS 5,632,087 A  *  5/1997  Motohashi .................... 30/43
5,921,134 A  *  7/1999  Shiba ........................... 74/110
6,348,752 B1 *  2/2002  Erdman ........................ 310/2
6,441,517 B1 *  8/2002  Brum ........................... 310/37

* cited by examiner

Primary Examiner—Nestor Ramirez
Assistant Examiner—Iraj A Mohandesi
(74) Attorney, Agent, or Firm—Oblon, Spivak, McClelland, Maier & Neustadt, P.C.

(57) ABSTRACT

An improved linear oscillating actuator is capable of minimizing the undesired vibrations while moving first and second oscillators in parallel paths. The first and second oscillators carry first and second drive elements respectively for driving connection to individual reciprocating loads. The first and second drive elements project upwardly respectively from the first and second oscillators such that the first drive element is disposed immediately upwardly of the second oscillator and the second drive elements is disposed immediately upwardly of the first oscillator. With this reverse arrangement of the first and second drive elements relative to the first and second oscillators, the individual oscillating systems each including the oscillator, the drive element and the corresponding reciprocating load can have its mass center disposed in close proximity to a mass center of the actuator, thereby enabling to reduce undesired vibrations which would otherwise occur around the mass center of the actuator.

23 Claims, 14 Drawing Sheets

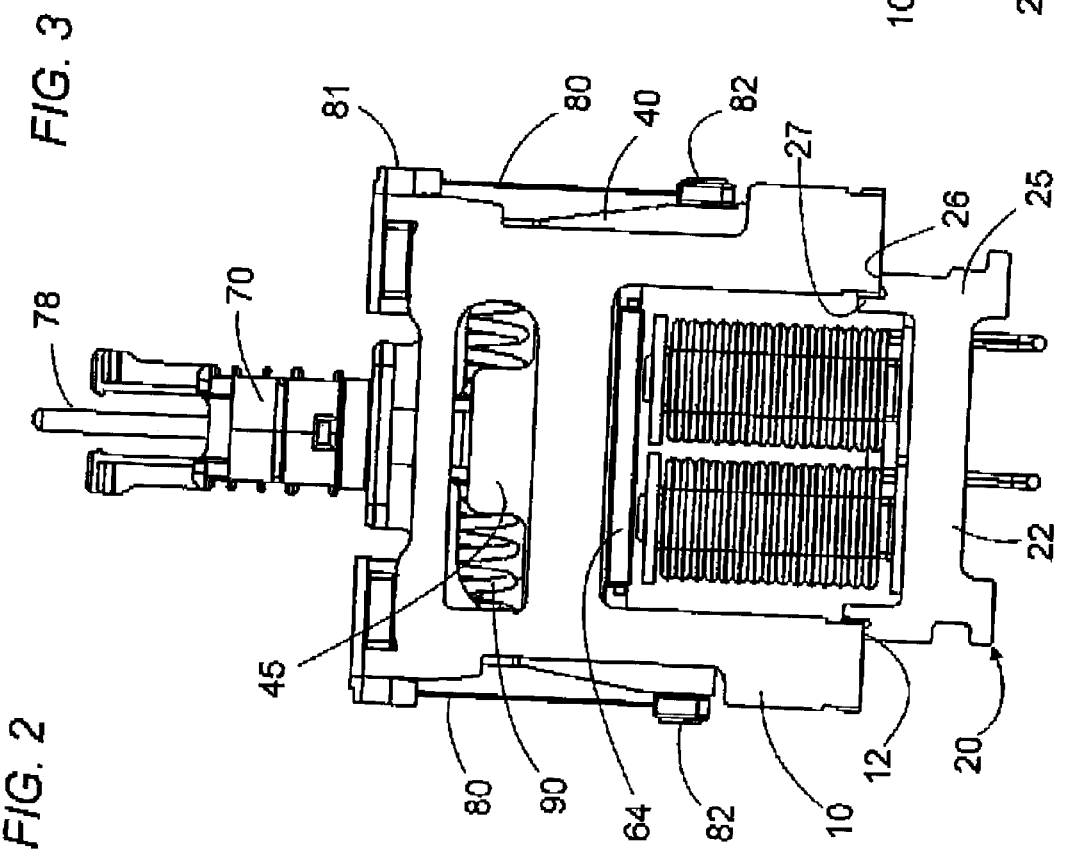

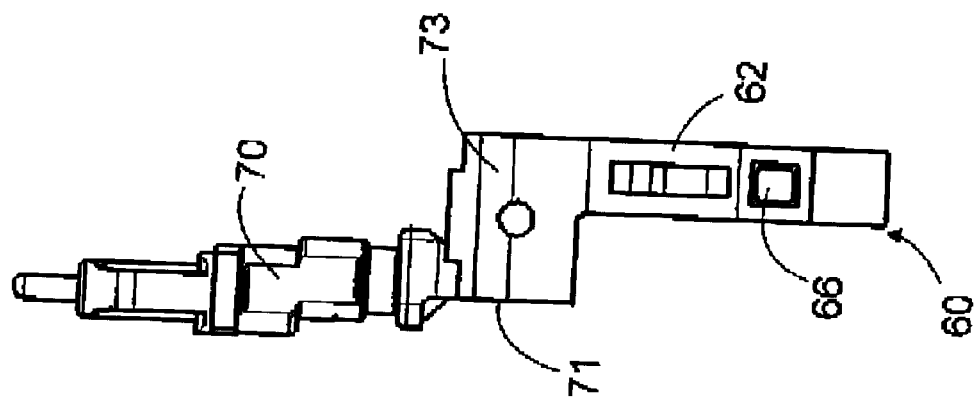
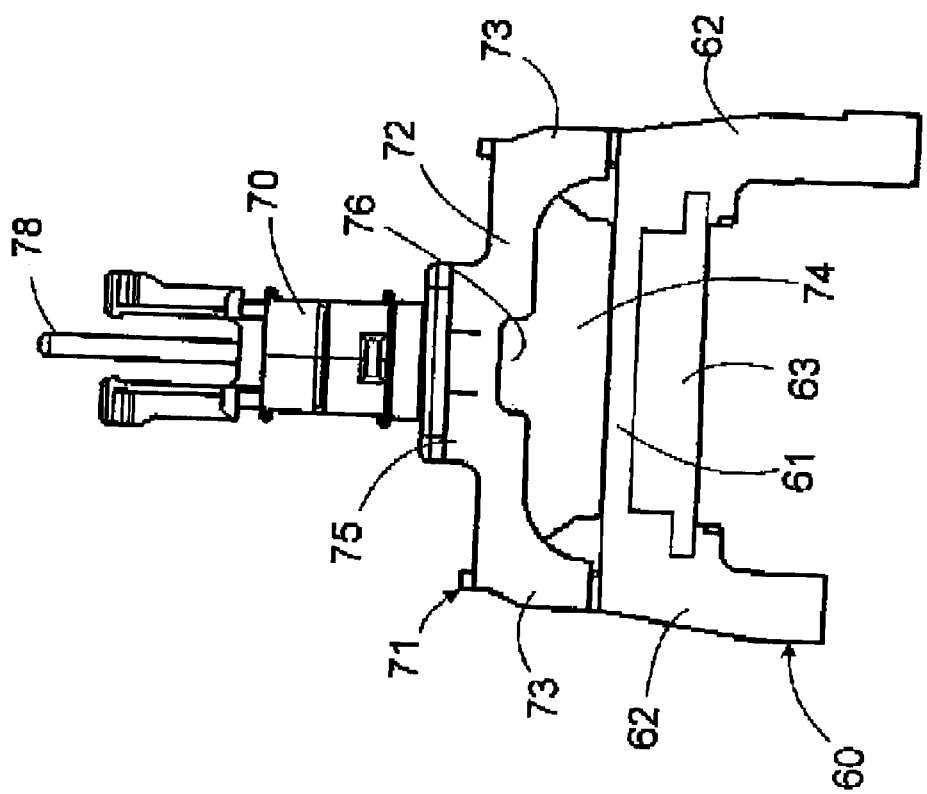
FIG. 6A
FIG. 6B

FIG. 17A
FIG. 17B
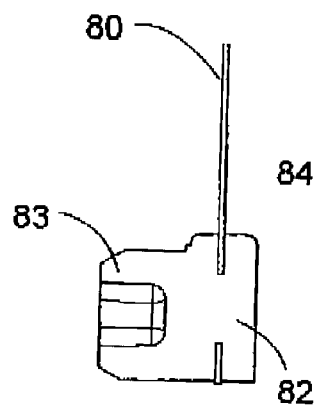
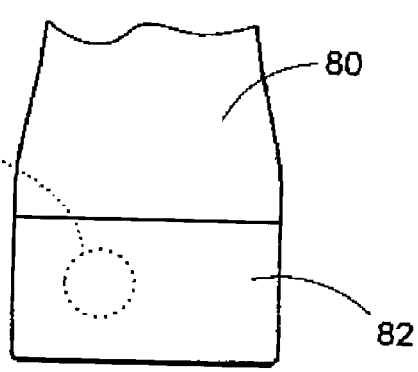
FIG. 18A
FIG. 18B
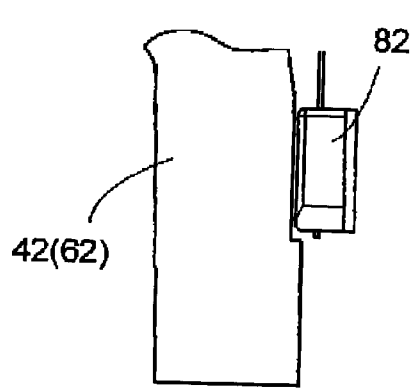
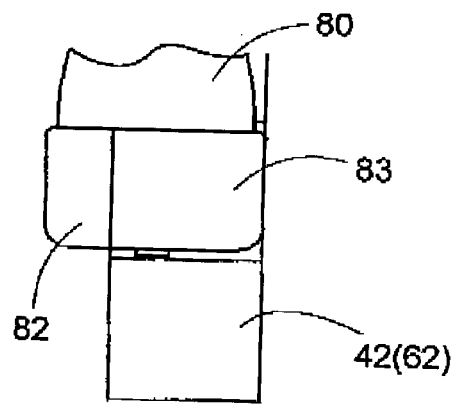
FIG. 19A
FIG. 19B
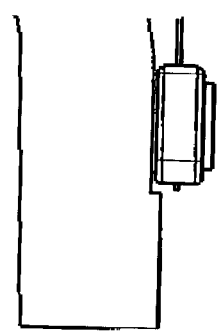
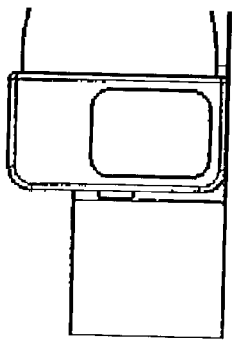

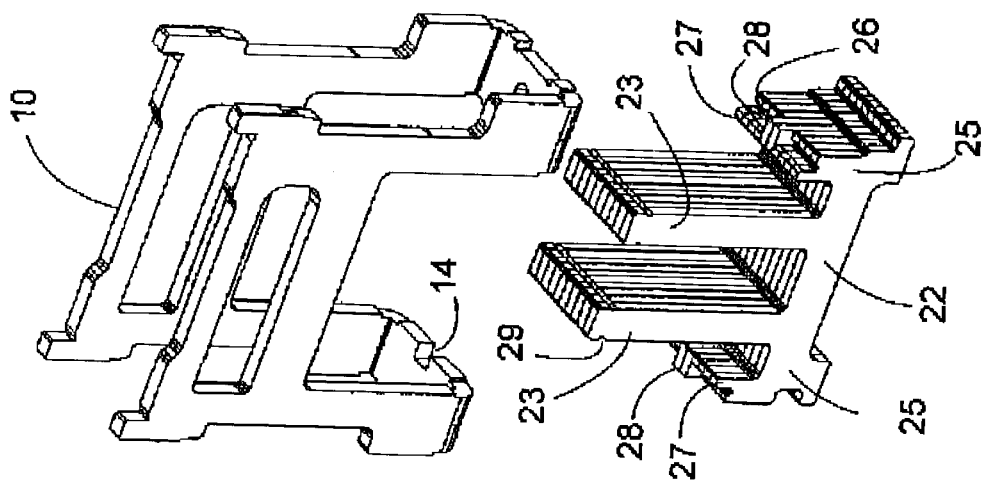
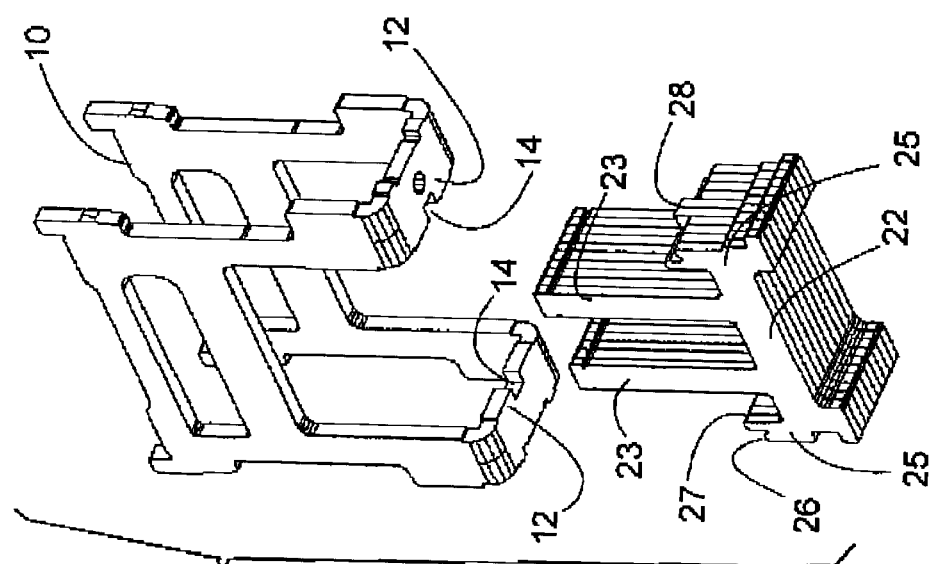

LINEAR OSCILLATING ACTUATOR

BACKGROUND OF THE INVENTION

1. Field of the Invention

The present invention is directed to a linear oscillating actuator, and more particularly to a linear oscillating actuator having a pair of oscillators moving in parallel paths for driving individual loads.

2. Description of the Prior Art

A linear oscillating actuator has been utilized in many fields as an alternative to the rotary driving source. Particularly, as disclosed in U.S. Pat. No. 5,632,087, the linear actuator has found itself advantageous for use as a driving source of dry shavers of reciprocatory type. When applied to the shaver having a pair of inner cutters, i.e., the reciprocating loads, the linear oscillating actuator is designed to have a corresponding pair of oscillators running in parallel oscillating paths and being adapted for driving connection respectively with the inner cutters. In this instance, each individual oscillating system composed of the oscillator and the corresponding reciprocating load has its mass center offset in a lateral direction perpendicular to the oscillating direction from a mass center of the actuator or the shaver. Due to this offset arrangement of the individual oscillating systems from the mass center of the actuator, the actuator suffers from undesired vibrations around its mass center

SUMMARY OF THE INVENTION

The present invention has been achieved in view of the above problem to provide an improved linear oscillating actuator which is capable of minimizing the undesired vibrations, while moving a pair of oscillators in parallel paths. The linear oscillating actuator in accordance with the present invention includes a stator having one of an electromagnet and a permanent magnet, first and second oscillators each having the other of the electromagnet and the permanent magnet, and a chassis fixedly mounting the stator and movably supporting the first and second oscillators in such a manner as to allow them to move respectively in parallel linear paths. The electromagnet includes a winding receiving a drive current to generate a magnetic field which interacts with the permanent magnet to cause the oscillators to oscillate relative to the stator respectively in the parallel linear paths. A first drive element integrally projects from the first oscillator and is adapted to be connected to a reciprocating load for driving the same, while the second drive element integrally projects from the second oscillator and is adapted to be connected to a reciprocating load for driving the same. An important feature of the present invention resides in that the first and second drive elements project upwardly respectively from the first and second oscillators such that the first drive element is disposed immediately upwardly of the second oscillator and the second drive elements is disposed immediately upwardly of the first oscillator. With this reverse arrangement of the first and second drive elements relative to the first and second oscillators, the individual oscillating systems each including the oscillator, the drive element and the corresponding reciprocating load can have its mass center disposed in close proximity to a mass center of the actuator, thereby enabling to reduce undesired vibrations which would otherwise occur around the mass center of the actuator.

The first and second oscillators are configured to have lengths respectively extending along the liner paths and to have respective upright axes. In a preferred embodiment, the first drive element is integrally connected to a lengthwise center of the first oscillator by way of a center stem which extends obliquely with respect to the upright axis of the first oscillator, while the second drive element is integrally connected to opposite lengthwise ends of the second oscillator by way of a gate which is offset laterally in a direction perpendicular to the length of the second oscillator. The gate has an opening through which the center stem of the first oscillator extends loosely so that the first drive element is allowed to oscillate without being jammed with the second drive element. Thus, the first and second drive elements can be successfully disposed respectively immediately above the second and first oscillators without sacrificing the oscillatory movement.

Projecting on top of the first oscillator is a reinforcement fin which merges into the juncture of the center stem with the first oscillator. The reinforcement fin extends in the lengthwise direction of the first oscillator over a distance greater than the lengthwise dimension of the center stem measured with respect to the length of the first oscillator. With the inclusion of the reinforcement fin, the first oscillator is given sufficient rigidity against deforming force acting in the lengthwise direction along the oscillating path, assuring a stable and reliable oscillating performance.

The gate on the side of the second oscillator is shaped to have a bridge anchored at its opposite ends to the lengthwise ends on top of the second oscillator so as to define the opening between the bridge and the second oscillator. The reinforcement fin opposes the bridge with a small clearance therebetween so as to be capable of bearing the bridge when the second drive element is depressed. Thus, the gate can be protected against a possible impact or stress applied to the reciprocating load or the second drive element.

Further, the bridge may be formed at its longitudinal center with a raised platform from which the second drive element projects in order to strengthen the joint between the second drive element and the second oscillator sufficiently to withstand the impact or stress applied to the second drive element.

The first and second oscillators have respective legs for anchored connection with the chassis. Further included in the actuator is a link which interlocks the first and second oscillators in such a manner as to oscillate the oscillators in opposite phase. In this connection the leg of each of the first and second oscillators is connected to the link at a point below the anchored connection of the leg with the chassis. That is, each oscillator is connected to the chassis and also to the link at vertically spaced points, thereby requiring no extra dimensions with respect to the longitudinal and lateral directions for the interlocking connection, and therefore contributing to a compact design.

The center stem of the first oscillator can be given increased rigidity by a reinforcement member embedded therein. The reinforcement member may be either in the form of a metal pin or a part of a back yoke provided in the first oscillator adjacent to the permanent magnet. The metal pin may project out of the first drive element for driving connection with the reciprocating load.

The first and second oscillators are suspended frown the chassis by means of respective leaf springs so that the oscillators are movable only along the linear oscillating paths under the bias of the springs. Each leaf spring has a portion wider than a thickness of a corresponding one of the first and second oscillators so as to be given sufficient resistance to a torsion for stably supporting the oscillator.

The leaf spring is offset laterally relative to the corresponding ones of the first and second oscillators in the thickness direction thereof, while being disposed close to each other in the thickness direction. Thus, the first and second oscillators can be held close to each other, yet allowing the use of the leaf springs having the wider portion than the thickness of the oscillator. Whereby, it is possible to make compact the actuator in the thickness direction of the oscillators while stably supporting the oscillators to the chassis.

In a preferred embodiment, the leaf spring is connected at its upper end with the chassis and at its lower end with one of the first and second oscillators. The lower end of the leaf spring may be configured to have a width either substantially equal to or less than that of the upper end of the leaf spring.

Further, in order to facilitate the connection of the leaf spring to the oscillator, the leaf spring may carry at its lower end a joint which is molded from a plastic material to have a means for connection with the corresponding one of the first and second oscillators. In this connection, the leaf spring may be formed with a hole into which a portion of the joint engages for firmly securing the joint to the leaf spring. The joint has a projection for insertion into a recess formed in the lower end of the corresponding one of the first and second oscillators.

The present invention further discloses a unique structure of mounting the stator to the chassis. The stator has the electromagnet composed of a core and the winding disposed around the core. The core has an upper end which opposes the permanent magnet on the side of the first and second oscillators to define therebetween a magnetic gap. The core is formed at its lower end with an extension having a stator's mating surface which abuts against a chassis's mating surface at a corresponding portion of the chassis for welding connection of the stator with the chassis. Preferably, both of the stator's mating surfaces and the chassis's mating surface are finished as flat horizontal surfaces.

The extension may also include a first stopper which engages with the chassis to fix the stator thereto with respect to a longitudinal direction along the linear path, and a second stopper which engages with the chassis to fix the stator thereto with respect to a lateral direction perpendicular to the longitudinal direction. Thus, the stator can be positioned accurately relative to the chassis without requiring external jig.

Further, the core may be given a means for latching engagement with a coil bobbin interposed between the core and the winding for stably holding the coil bobbin in position.

These and still other objects and advantageous features of the present invention will become more apparent from the following description of the embodiments when taken in conjunction with the attached drawings.

BRIEF DESCRIPTION OF THE DRAWINGS

FIG 2 is a front view of the actuator;

FIG. 3 is a side view of the actuator;

FIGS. 5A and 6B are front and side view of a first oscillator utilized in the actuator;

FIGS. 6A and 6B are front and side view of a second oscillator utilized in the actuator;

FIGS. 17A and 17B are partial views of the lower end of a modified leaf spring, respectively;

FIGS. 18A and 18B are partial views of the lower end of a modified leaf spring shown with a corresponding portion of the oscillator, respectively;

FIGS. 19A and 19B are partial views of the lower end of a modified leaf spring shown with a corresponding portion of the oscillator, respectively;

FIGS. 22 and 23 are perspective views illustrating the chassis and a modified core viewed respectively from different directions.

DETAILED DESCRIPTION OF THE EMBODIMENT

Figure 1:
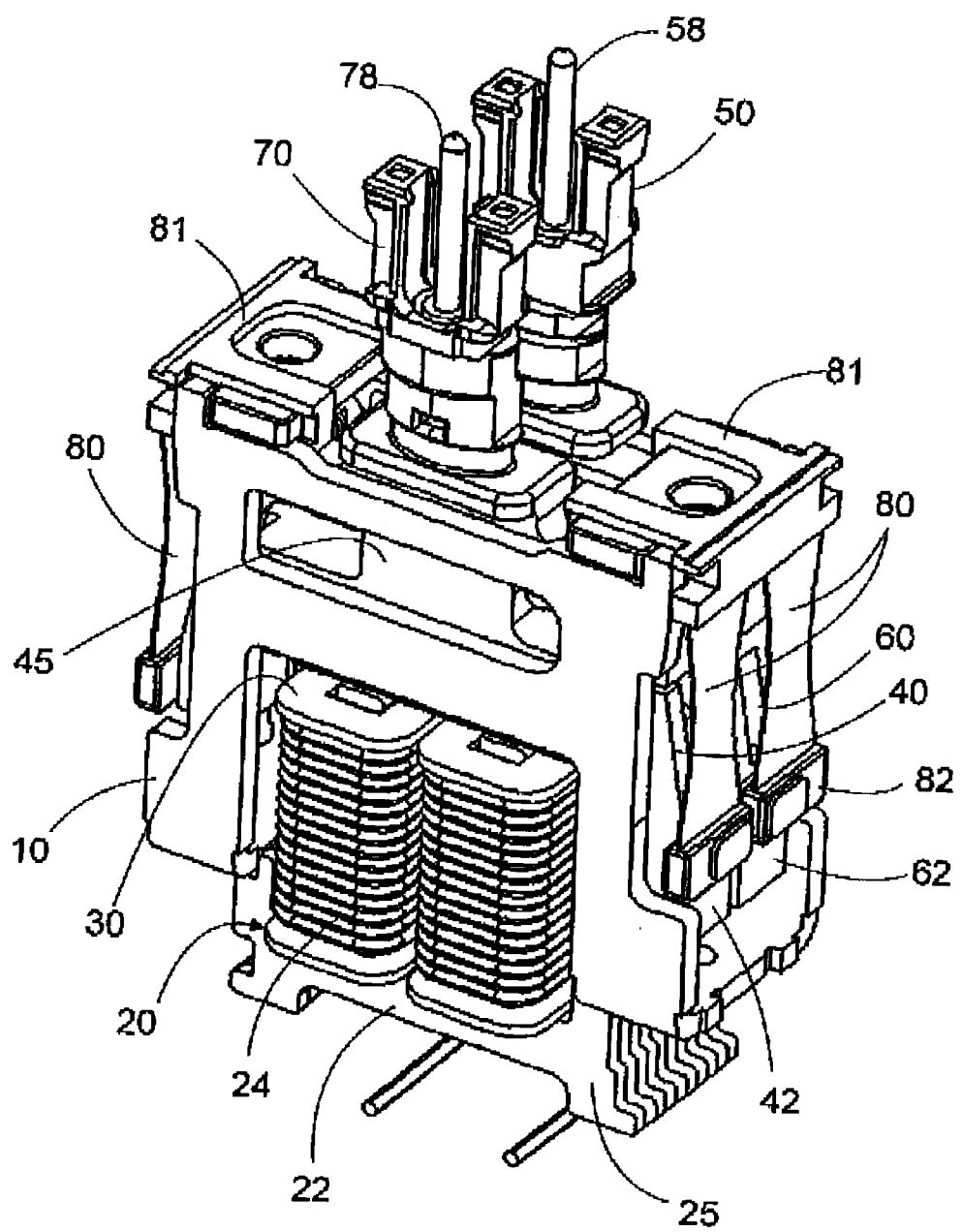
FIG. 1 is a perspective view of a linear oscillating actuator in accordance with a preferred embodiment of the present invention.
Figure 4:
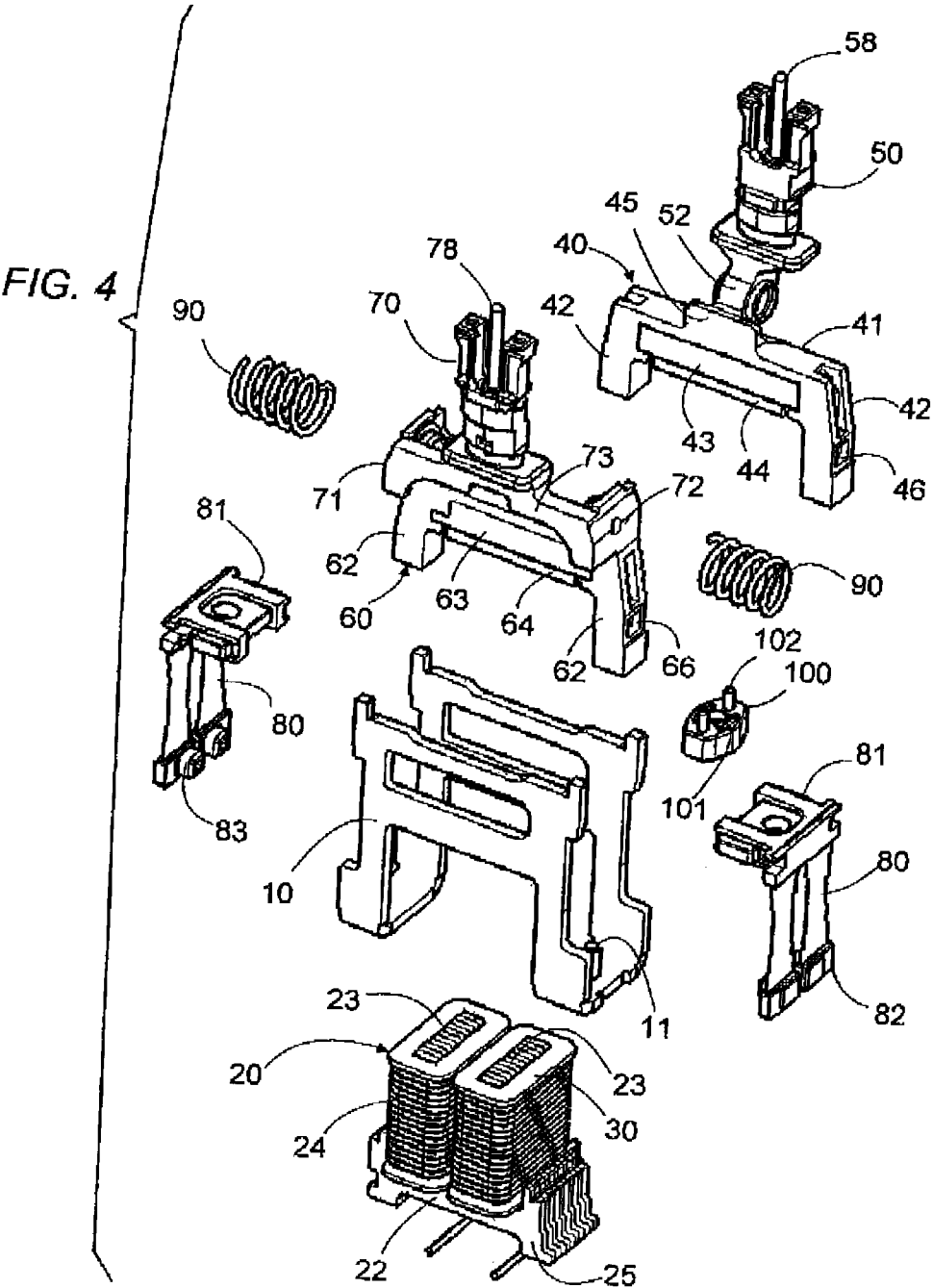
FIG. 4 is an exploded perspective view of the actuator.

Now referring to FIGS. 1 to 4, there is shown a linear oscillating actuator in accordance with the present invention which is adapted to be incorporated in a dry shaver as a driving source for oscillating a pair of inner cutters respectively in parallel linear paths relative to an outer cutter. The actuator is basically composed of a chassis 10 mounting a stator 20 and a pair of oscillators, i.e., a first oscillator 40 and a second oscillator 60. The stator 20 is realized in the form of an electromagnet composed of a core 22 and a pair of windings 24 disposed respectively around two upright poles 23 of the core 22. The windings 24 are connected in series and supplied with an alternating current to generating a magnetic field of alternating polarity. The first and second oscillators 40 and 60 are suspended from the chassis 10 respectively by means of leaf springs 80 so as to be movable only in the linear paths defined along a horizontal length of the chassis 10. In this connection, the chassis 10 has the horizontal length, an upright axis defining the height of the actuator, and a lateral width defining the width of the actuator. The oscillators and the associated parts are explained in this description to have a length along the horizontal length of the chassis, to have a thickness along the lateral width of the chassis, and to have a height along the upright axis of the chassis 10. The first and second oscillators 40 and 60 are provided respectively with permanent magnet 44 and 64 which are so magnetized to interact with the magnetic field of the electromagnet for oscillating the oscillators along the lengthwise direction in a reverse phase relation to each other. The first and second oscillators are molded from a plastic material to have integral first and second drive elements 50 and 70 which are adapted to be connected with the inner cutters, i.e., the reciprocating loads for driving the same.

Figure 5B:
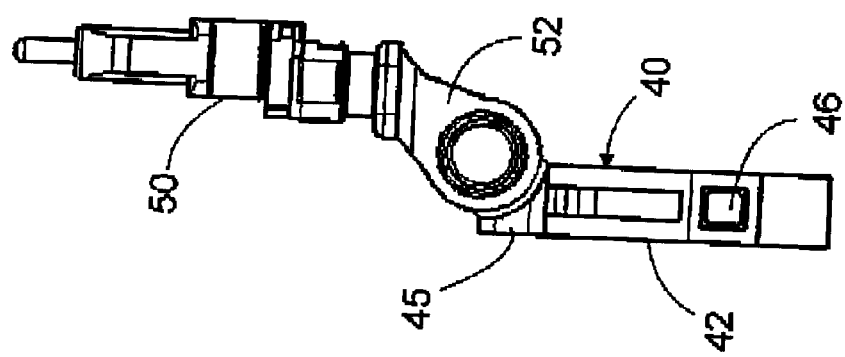
Figure 5A:
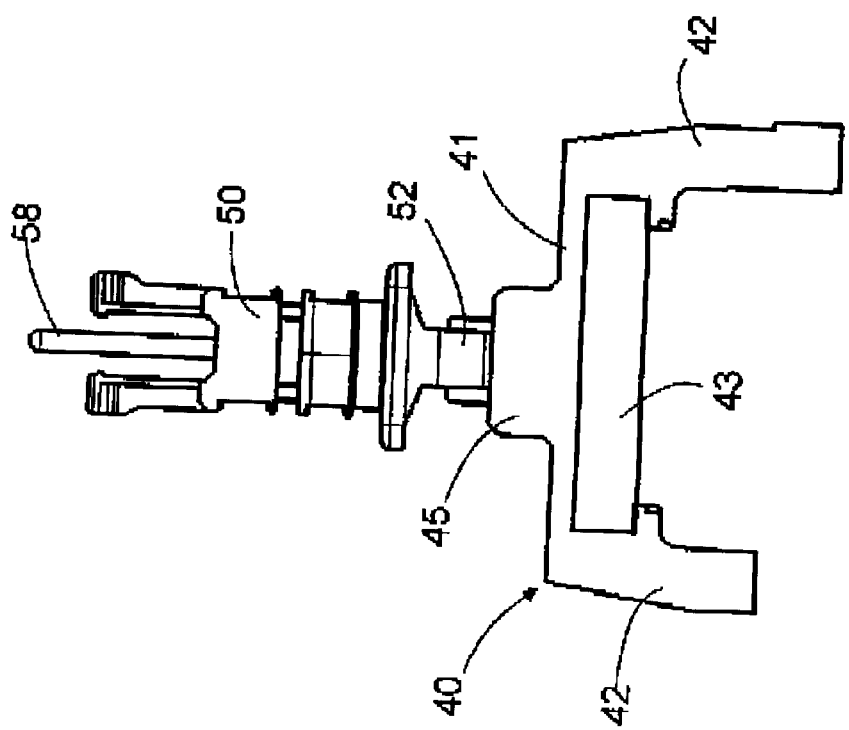

As best shown in FIGS. 5A and 5B, the first oscillator 40 is of a generally U-shaped configuration having a top bar 41 and a pair of legs 42 depending from opposite ends of the top bar. The first drive element 50 extends integrally from the longitudinal center of the top bar 41 through an inclined stem 52 in such a manner as to project upright but in a laterally offset relation from the first oscillator 40. A drive pin 58 is inserted in the first drive element 50 to project therefrom for connection with the inner cutter. Embedded in the top bar 41 is a back yoke 43 which backs up the permanent magnet 44. A reinforcement fin 46 of reduced height extends integrally from the top bar 41 over a lengthwise distance larger than the dimension of the stem 52 along the same lengthwise distance and merges into the lower end of the stem 62, thereby strengthening the connection of the drive element 50 with the oscillator 40.

Figure 7C:
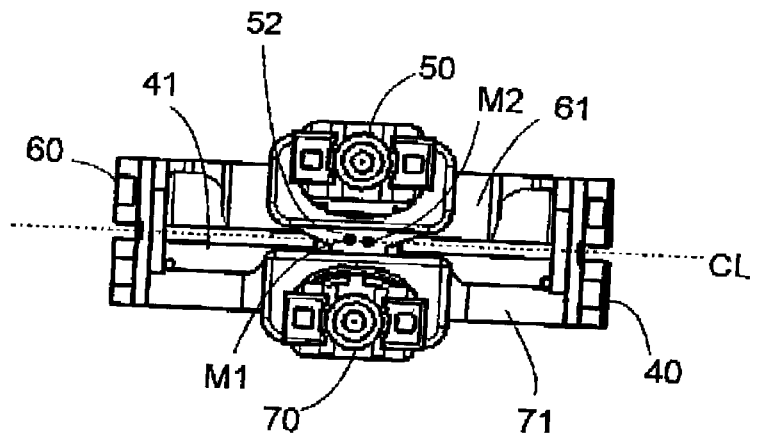
FIGS. 7A, 7B, and 7C are front, side, and top views of a combination of the fist and second oscillators.
Figure 7A:
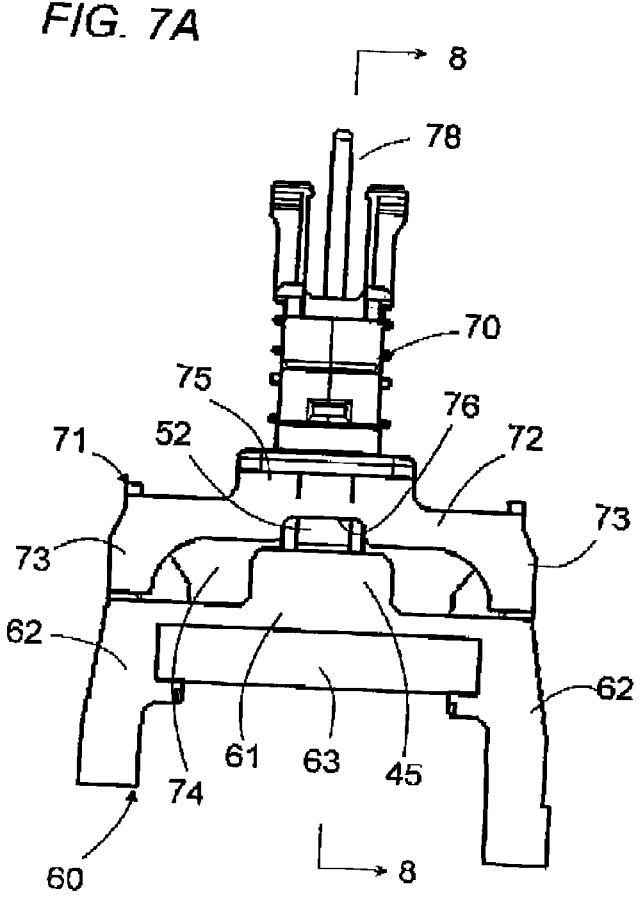
Figure 7B:
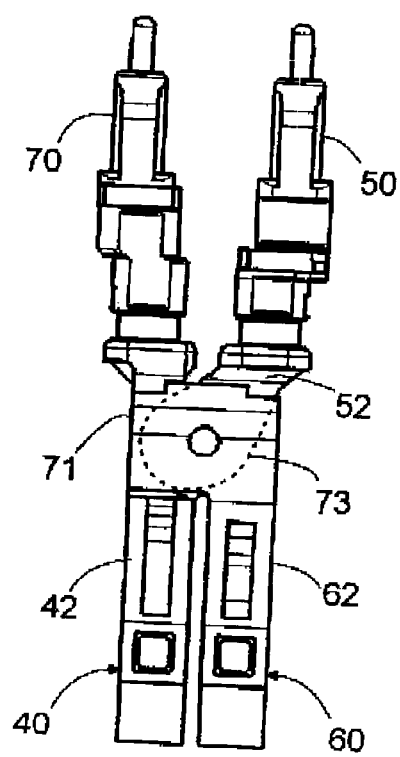
Figure 8:
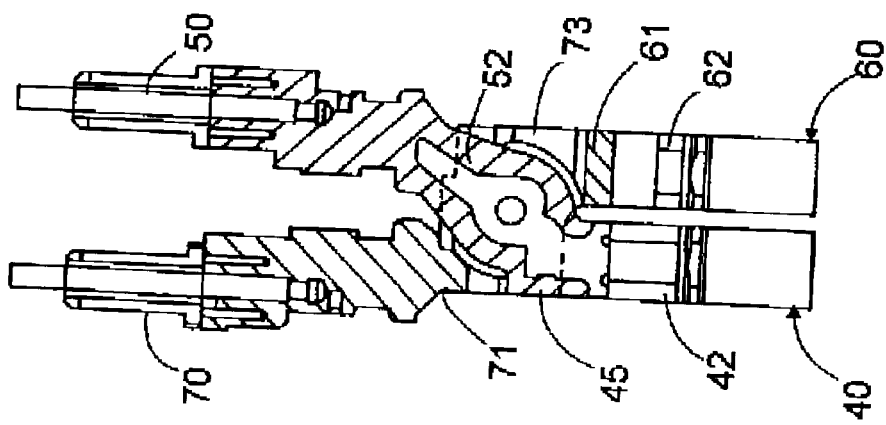
FIG. 8 is a sectional view taken along line 8—8 of FIG. 7A.

As shown in FIGS. 6A and 6B, the second oscillator 60 is of generally identical configuration to the first oscillator 40 to have a top bar 61 and a pair of opposed legs 62. The second drive element 70 extends integrally from the second oscillator 60 through a gate 71 which is of generally U-shaped configuration having a horizontal bridge 72 and a pair of anchor legs 73 joining at the respective lower ends to the opposite ends of the top bar 61. In detail, the second drive element 70 projects upright from the longitudinal center of the bridge 72 in a laterally offset relation from the upright axis of the second oscillator 60. That is, the gate 71 is itself offset laterally from the second oscillator 60 with the anchor legs 73 connected at its lateral ends to the top bar 61 of the second oscillator 60, as shown in FIG. 6B. Formed between the bridge 72 and the top bar 61 is an opening 74 through which the stem 52 of the first drive element 50 extends such that, as shown in FIGS. 7C and 8, the first drive element 50 is disposed immediately upwardly of the second oscillator 60 and the second drive element 70 is disposed immediately upwardly of the first oscillator 40. The opening 74 has its lower boundary only defined by the top bar 61 of the first oscillator laterally offset from the bridge 72. This means that the opening 74 has its immediate bottom left open such that the top bar 41 of the first oscillator 40 is positioned immediately below the gate 71 and is kept in level with the top bar 61 of the second oscillator 60. With this reverse arrangement of the first and second drive elements 60 and 70 relative to the first and second oscillators 40 and 60, the individual oscillating systems each including the oscillator, the drive element and the corresponding reciprocating load can have its mass center M1 and M2 disposed in close proximity to a mass center of the actuator along the lateral direction perpendicular to the longitudinal direction, i.e., the oscillating direction of the oscillators, as shown in FIG. 8. That is, the individual mass centers M1 and M2 can be aligned on or closely adjacent to a center line CL when the reciprocating loads are attached to the individual drive elements 50 and 60. Whereby it is possible to greatly reduce undesired vibrations which would otherwise occur around an upright axis passing through the mass center of the whole assembly, i.e., the actuator.

The second drive element 70 projects from a raised platform 75 which is formed at a longitudinal center of the bridge 72 and has a recess 76 in its bottom to impart resistivity against an impact which may be applied to the gate through the second drive element. When the second oscillator 60 is combined with the first oscillator 40, the reinforcement fin 45 of the first oscillator 40 is positioned just below the bridge 72 with a small clearance therebetween, such that the reinforcement fin 45 can bear the bridge 72 when the bridge is deformed as a consequence of the second drive element being subject to the impact. The second drive element 70 also includes a drive pin 78 for driving connection to the inner cutter, i.e., the reciprocating load.

Figure 15:
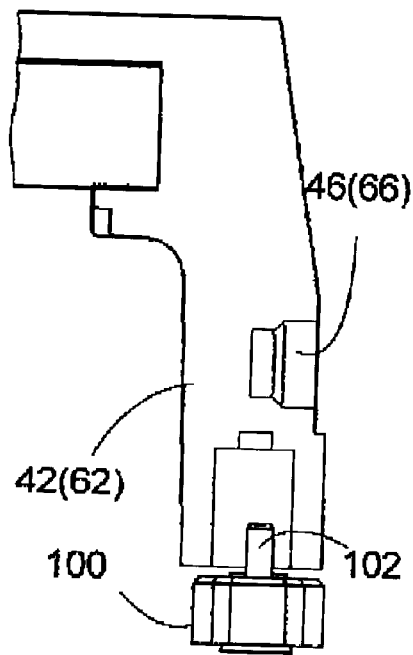
FIG. 15 is a sectional view of a part of the oscillator.

Interposed between the stem 62 of the first oscillator 40 and the anchor legs 73 of the second oscillator 60 are coil springs 90 which are cooperative with the leaf springs 80 to give restoring forces for counteracting the magnetic driving force developed by the electromagnet and therefore establishing the oscillation system. The first and second oscillators 40 and 60 are interlocked by means of a link 100 pivotally supported to the chassis 10 so that the oscillators 40 and 60 oscillates in counter directions. As shown in FIG. 3, the link 100 has a hole 101 receiving a pivot axis 11 projecting on the bottom of the chassis 10, and has a pair of pins 102 for loose engagement into corresponding pivot holes 49, 69 each formed in the bottom of the leg of each of the first and second oscillators 40 and 60, as shown in FIG. 15.

Figure 10:
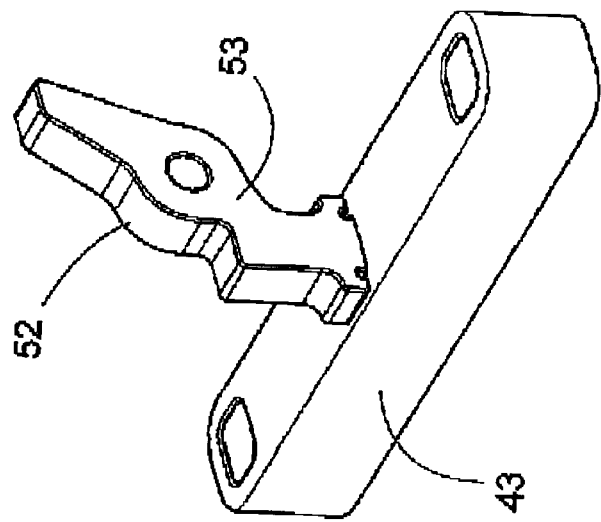
FIG. 10 is a perspective view of an internal structure of the first oscillator.
Figure 9:
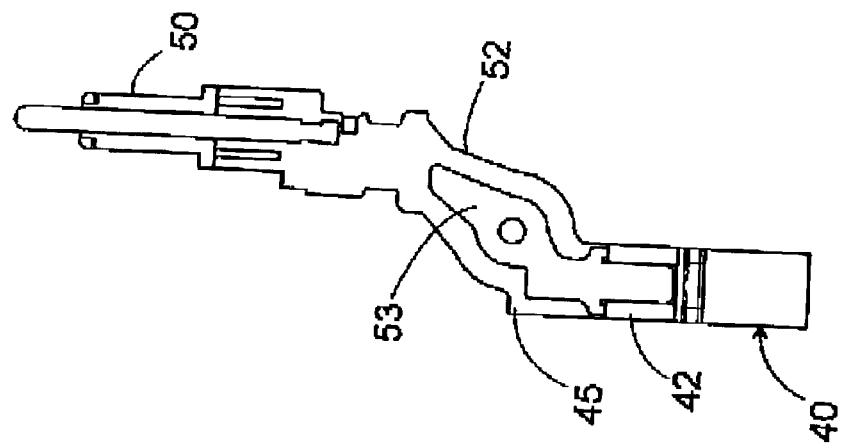
FIG. 9 is a sectional view of the first oscillator.
Figure 13:
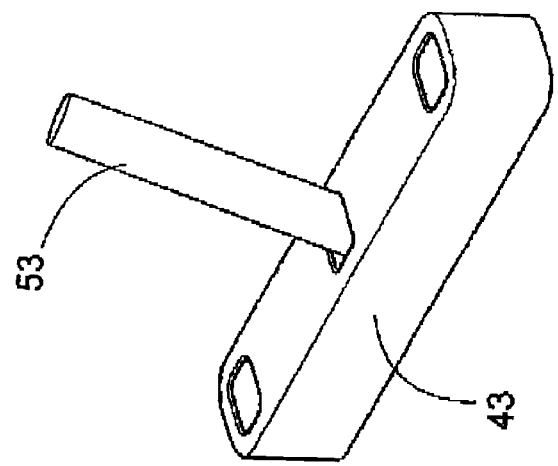
FIGS. 11 to 13 are views respectively illustrating modified structures of the first oscillator.
Figure 12:
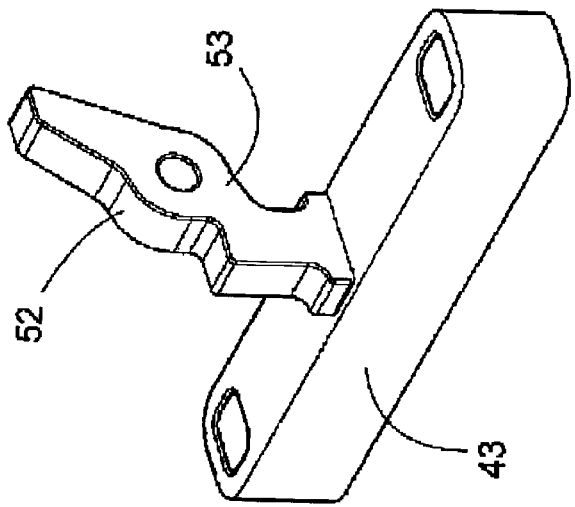
Figure 11:
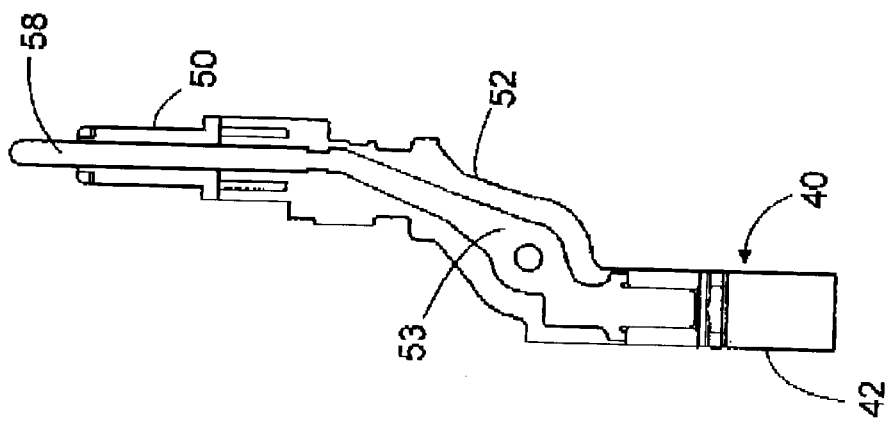

As shown in FIGS. 9 and 10, the first oscillator 40 carries a metal-made reinforcement member 53 which is embedded in a portion extending from the top bar 41 through the stem 52 with its lower end anchored to the back yoke 43 for imparting increased rigidity to the connection between the first oscillator 40 and the first drive element 60. In addition to the reinforcement effect, the metal member 53 is incorporated to adjust the position of the mass center for the oscillating system including the oscillator and the drive element. The reinforcement member 53 may be formed integrally with the drive pin 68, as shown in FIG. 11, or may be formed integrally with the back yoke 43, as shown in FIG. 12. Further, the reinforcement member 53 may be in the form of a pin anchored at its lower end to the back yoke 43, as shown in FIG. 13.

Figure 14:
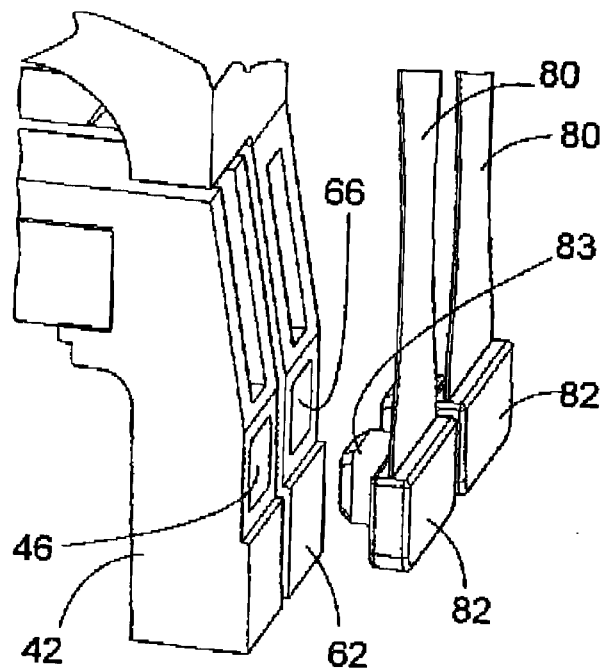
FIG. 14 is an exploded perspective view showing connections of the first and second oscillators to associated leaf springs, respectively.
Figure 16A:
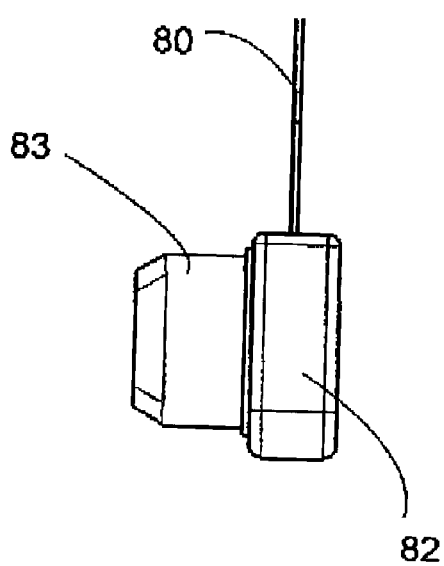
FIGS. 16A and 16B are partial views of the lower end of the leaf spring, respectively.
Figure 16B:
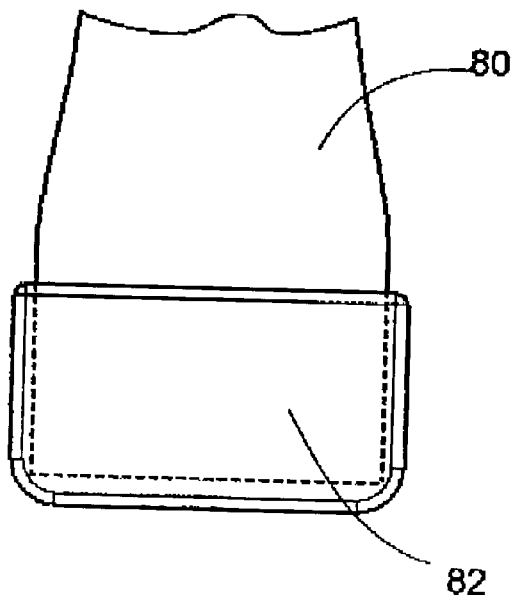

Turning back to FIGS. 1 to 4, each of the leaf springs 80 carries at its upper end a fastener 81 for secure engagement with the upper end of the chassis 10, and carries at its lower end a joint 82 for secure engagement with the lower end of the leg 42, 62 of each oscillator. As shown in FIG. 14, the joint 82 is molded around the lower end of the spring 80 to have a square stud 83 which engages into a corresponding square hole 46, 66 at the lower end of the leg 42, 42 of each oscillator 40, 60 and is thereafter welded thereto by the known ultrasonic welding. One of the legs of each oscillator is longer than the other to have the hole 46, 66 at a location immediately upwardly of the pivot hole 49, 69, as shown in FIG, 15 while the other leg has the hole 46, 66 at its lower end. As shown in FIGS. 16A and 16B, the joint 82 covers the entire width of the lower end of the spring 80 to make the square cross-section of the stud 83 as large as possible in order to suspend the oscillator straight and therefore keep a precise positioning of the permanent magnet relative to the pole ends of the electromagnet, thereby assuring a stable oscillating movement of the oscillators. As shown in FIG. 3, that the spring 80 has a narrowed width at its lengthwise center to give a desired biasing force, while having the upper and lower ends having a width greater than the thickness of the leg of the oscillator so as to give the above effect of precisely positioning the oscillators as well as to give a secure connection of the spring to the oscillators. In this connection, the springs 80 having the enlarged upper and lower width are offset laterally from the oscillators but within the thickness of the chassis 10 in order to keep the oscillators in closely adjacent relation to each other, making the whole assembly compact. For increased bonding strength to the joint 82, the spring 80 may be formed with a through-hole 84 for entrapping a portion of the joint 82, as shown in FIGS. 17A and 18B. Further, as shown in FIGS. 18 and 19, the joint 82 may be formed at a portion immediately opposite of the stud 83 with a bump 86 which is adapted to be in contact with a horn of the ultrasonic welder for concentrating the ultrasonic bonding pressure to the stud.

Figure 21:
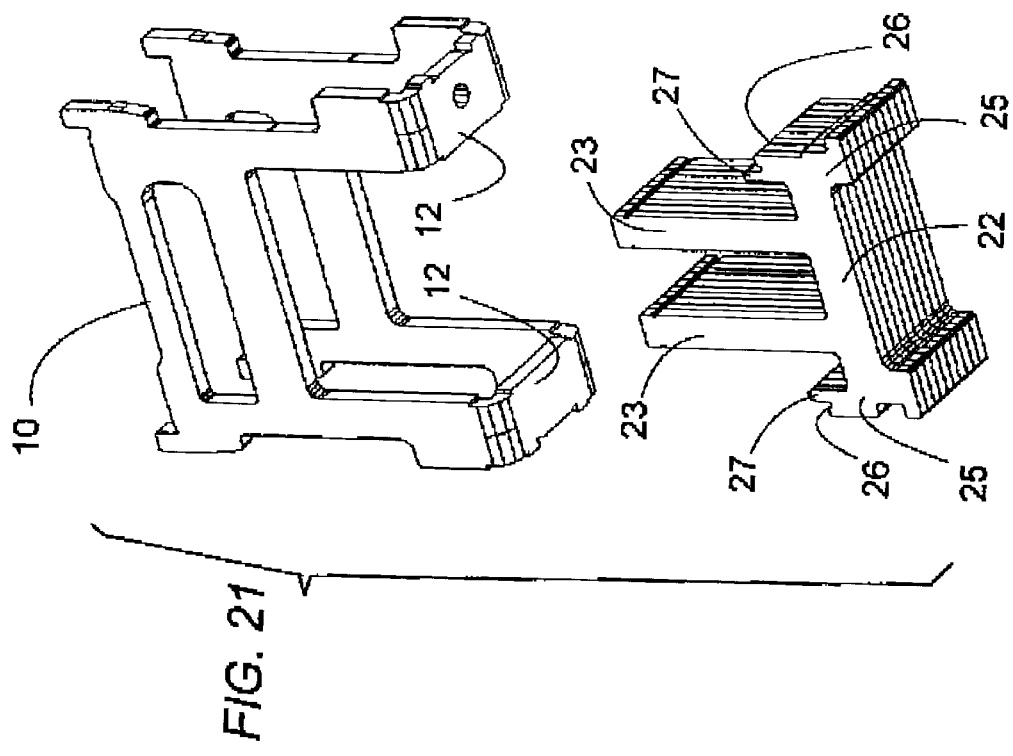
FIGS. 20 and 21 are perspective views illustrating the chassis and the core viewed respectively from different directions.
Figure 20:
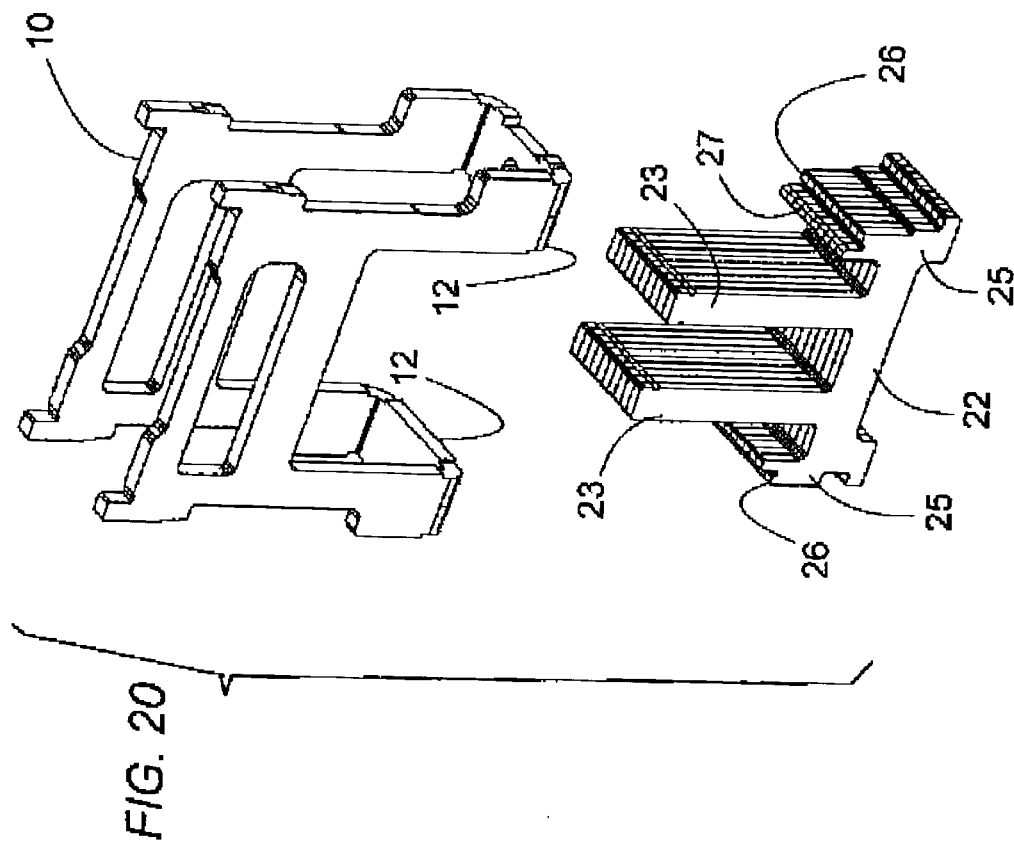

As shown in FIG. 20, the core 22 is made from a stack of the metal plates to have horizontal extensions 25 extending longitudinally away from the poles 23. The extensions 25 are each formed with a stator's mating surface 26 which is a flat horizontal surface for abutment against a chassis's mating surface 12 also of a flat horizontal surface at the lower end of the chassis 10. Thereafter, the extensions 25 are welded to the chassis 10. Thus, the core 22, i.e., the stator 20 forming the electromagnet can be easily and accurately assembled to the chassis 10 to give the precise magnetic gap between the poles 23 and the permanent magnets 44 and 64. Also formed on the extensions 25 adjacent the stator's mating surface 26 are first stoppers 27 which engage with the lower inner edges of me chassis 10, as seen from FIGS. 20 and 21, so as to fix the stator 20 to the chassis 10 relative to the lengthwise direction, i.e., the oscillating direction of the oscillators 40 and 60. Further, as shown in FIGS. 22 and 23, the extensions 25 may be formed with second stoppers 28 which project from the stator's mating surfaces 26 to engage with slits 14 respectively formed in the lower inner edges of the chassis 10 so as to fix the stator 20 to the chassis 10 with respect to the lateral direction perpendicular to the oscillating direction, facilitating to make correct positioning of the stator to the chassis prior to the welding.

Figure 25:
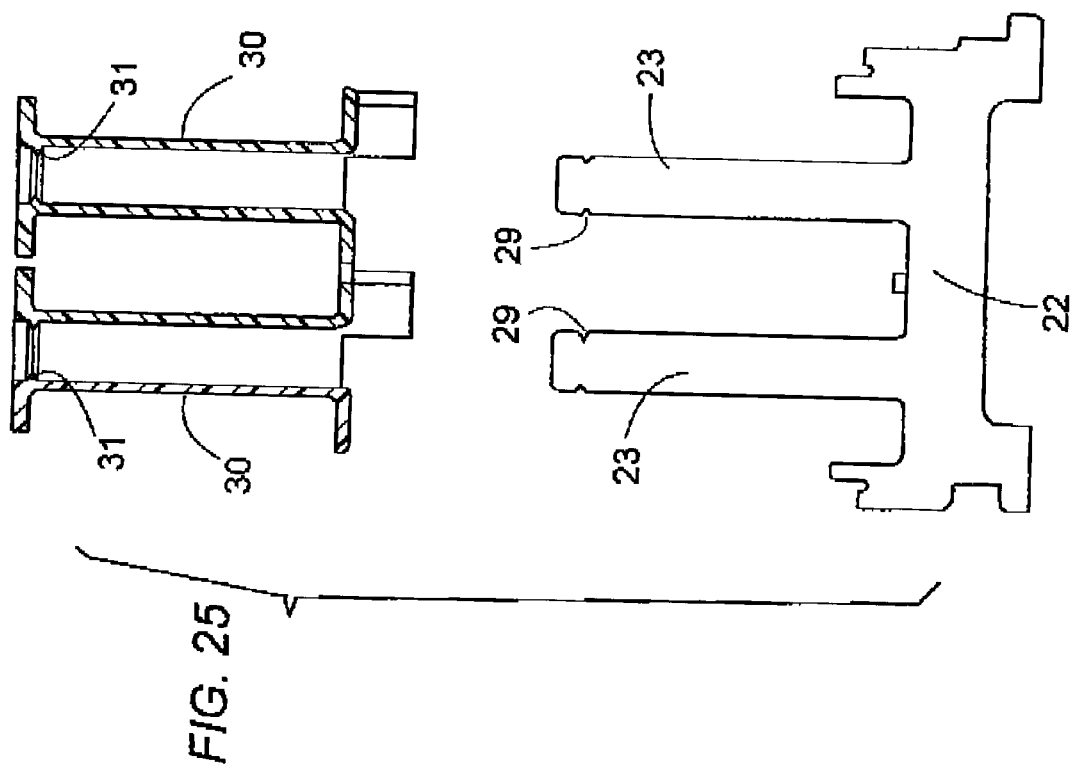
FIG. 25 is an exploded front view of the combination of the core and the coil bobbin.
Figure 24:
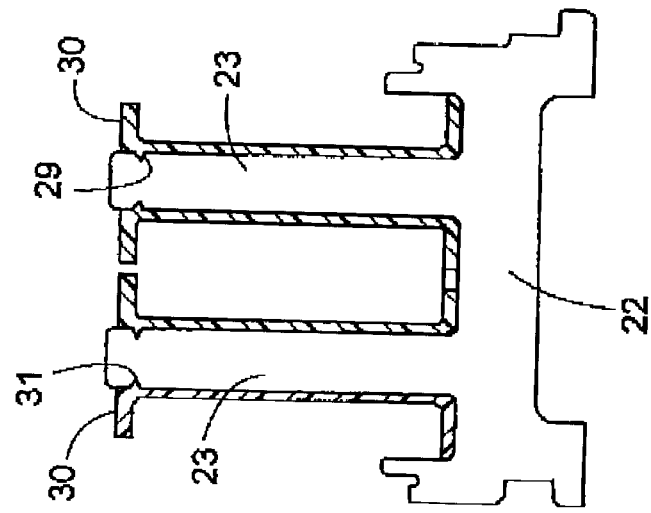
FIG. 24 is a front view partly in section of the combination of a core and a coil bobbin of the stator.

As shown in FIGS. 24 and 25, each of the poles 23 of the core 22 is fitted with a coil bobbin 30 of dielectric material for holding the winding 24 therearound. The coil bobbin 30 is formed at its upper end with a latch projection 31 which projects radially inwardly for latching engagement with a corresponding notch 29 formed at the upper end of each pole 23 of the core 22. Thus, the coil bobbin 30 can be easily assembled to the core 22.

Figure 26:
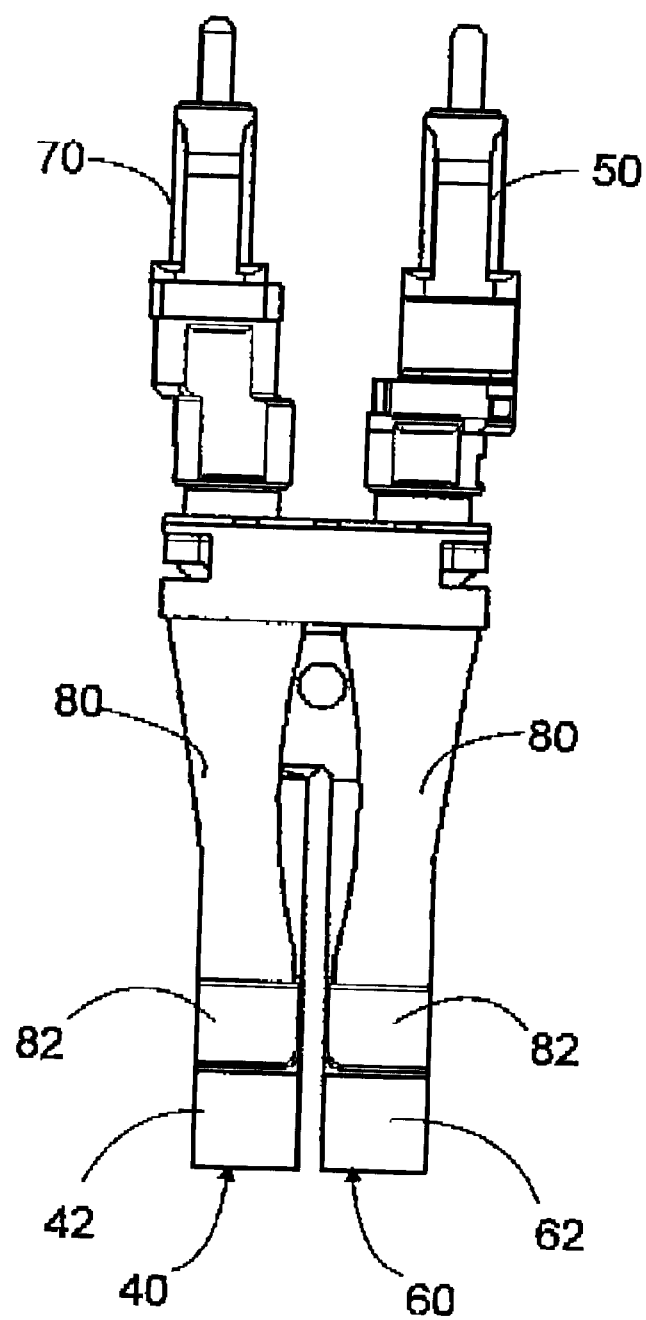
FIG. 26 is a side view of a modified actuator in accordance with the present invention.

FIG. 26 illustrates a modified actuator which is identical to that explained hereinbefore except that the lower end of each leaf spring 80 has a width equal to the thickness of the corresponding one of the legs 42 and 62 of the first and second oscillators 40 and 60. The leaf spring 80 has a width larger at the upper end than at the lower end. The upper end of the leaf spring 80 is offset laterally from the upright axis of the corresponding one of the legs 42 and 62 of the first and second oscillators, while keeping the legs in closely adjacent relation.

What is claimed is:

1. A linear oscillating actuator comprising:
   a stator having one of an electromagnet and a permanent magnet;
   first and second oscillators each having the other of said electromagnet and said permanent magnet;
   a chassis fixedly mounting said stator and movably supporting said first and second oscillators in such a manner as to allow them to move respectively in parallel linear paths;
   said electromagnet including a winding receiving a drive current to generate a magnetic field which interacts with the permanent magnet to cause said oscillators to reciprocate relative to said stator respectively in the parallel linear paths;
   a first drive element integrally projecting from said first oscillator and being adapted to be connected to a reciprocating load for driving the same; and
   a second drive element integrally projecting from said second oscillator and being adapted to be connected to a reciprocating load for driving the same;
   wherein said first and second drive elements project upwardly respectively from said first and second oscillators such that said first drive element is disposed immediately upwardly of said second oscillator and said second drive element is disposed immediately upwardly of said first oscillator.

2. The linear oscillating actuator as set forth in claim 1, wherein
   said first and second oscillators have lengths respectively extending along the linear paths, and have respective upright axes,
   said first drive element being integrally connected to a lengthwise center of said first oscillator by way of a center stem which extends obliquely with respect to the upright axis of said first oscillator,
   said second drive element being integrally connected to opposite lengthwise ends of said second oscillator by way of a gate which is offset laterally in a direction perpendicular to the length of said second oscillator, and
   said gate having an opening though which said center stem extends loosely so that said first drive element is allowed to oscillate without being jammed with said second drive element.

3. The linear oscillating actuator as set forth in claim 2, wherein
   a reinforcement fin projects on top of the first oscillator and merges into a juncture of the center stem with the first oscillator,
   said reinforcement fin extending in the lengthwise direction of the first oscillator over a distance greater than a lengthwise dimension of the center stem measured with respect to the length of the first oscillator.

4. The linear oscillating actuator as set forth in claim 3, wherein
   said gate comprises a bridge anchored at its opposite lengthwise ends to the lengthwise ends of said second oscillator so as to define said opening between the bridge and the second oscillator,
   said reinforcement fin opposing said bridge with a small clearance therebetween so as to be capable of bearing the bridge when the second drive element is depressed.

5. The linear oscillating actuator as set forth in claim 2, wherein
   said gate comprises a bridge anchored at its opposite lengthwise ends to the lengthwise ends of said second oscillator so as to define said opening between the bridge and the second oscillator,
   said bridge being formed at its lengthwise center with a raised platform from which said second drive element projects.

6. The linear oscillating actuator as set forth in claim 1, wherein
   said first and second oscillators have respective legs for anchored connection with said chassis,
   said actuator further including a link which interlocks the first and second oscillators in such a manner as to oscillate the oscillators in opposite phase, and
   the leg of each of said first and second oscillators being connected to said link at a point below the anchored connection of said leg with said chassis.

7. The linear oscillating actuator as set forth in claim 1, wherein
a reinforcement member is embedded in the center stem of said first oscillator.

8. The linear oscillating actuator as set forth in claim 7, wherein
said reinforcement member is in the form of a metal pin.

9. The linear oscillating actuator as set forth in claim 7, wherein
said reinforcement member is defined by a part of a metal pin projecting through the first drive element for driving connection with the reciprocating load.

10. The linear oscillating actuator as set forth in claim 7, wherein
said reinforcement member is a part of a back yoke provided in the first oscillator adjacent to the permanent magnet.

11. The linear oscillating actuator asset forth in claim 1, wherein
said first and second oscillators are suspended from said chassis by means of respective leaf springs,
each of said leaf springs having a portion wider than a thickness of a corresponding one of said first and second oscillators, and
said leaf springs being offset relative to the corresponding ones of said first and second oscillators in the thickness direction thereof, while being disposed close to each other in the thickness direction.

12. The linear oscillating actuator as set forth in claim 11, wherein
said leaf spring is connected at its upper end with said chassis and at its lower end with one of said first and second oscillators,
the lower end of said leaf spring having a width substantially equal to that of the upper end of said leaf spring.

13. The linear oscillating actuator as set forth in claim 11, wherein
said leaf spring is connected at its upper end with said chassis and at its lower end with one of said first and second oscillators,
the lower end of said leaf spring having a width less than the upper end of said leaf spring.

14. The linear oscillating actuator as set forth in claim 11, wherein
said leaf spring is connected at its upper end with said chassis and at its lower end with one of said first and second oscillators,
the lower end of said leaf spring carrying a joint which is molded from a plastic material to have a means for connection with the corresponding one of the first and second oscillators.

15. The linear oscillating actuator as set forth in claim 14, wherein
said leaf spring is formed at its lower end with a hole into which a portion of said joint engages for firmly securing the joint to the leaf spring.

16. The linear oscillating actuator as set forth in claim 14, wherein
said joint has a projection which is inserted into a recess formed in the lower end of the corresponding one of the first and second oscillators.

17. The linear oscillating actuator as set forth in claim 16, wherein
said projection has cross-section smaller than that of the joint.

18. The linear oscillating actuator as set forth in claim 1, wherein
said stator has the electromagnet composed of a core and the winding disposed around the core,
said core having an upper end which opposes said permanent magnets provided on the side of the first and second oscillators to define therebetween a magnetic gap, and
said core being formed at its lower end with an extension having a stator's mating surface which abuts against a chassis's mating surface at a corresponding portion of said chassis for welding connection of said stator with said chassis.

19. The linear oscillating actuator as set forth in claim 18, wherein
both of said stator's mating surface and said chassis's mating surface are flat horizontal surfaces.

20. The linear oscillating actuator as set forth in claim 18, wherein
said extension includes a first stopper which engages with the chassis to fix said stator to said chassis with respect to a longitudinal direction along said linear path.

21. The linear oscillating actuator as set forth in claim 20, wherein
said extension includes a second stopper which engages with the chassis to fix said stator to said chassis with respect to a lateral direction perpendicular to said longitudinal direction.

22. The linear oscillating actuator as set forth in claim 20, wherein
a coil bobbin is interposed between said core and said winding, said core having a means for latching engagement with said coil bobbin.

23. A linear oscillating actuator comprising:
a stator having one of an electromagnet and a permanent magnet;
first and second oscillators each having the other of said electromagnet and said permanent magnet;
a chassis fixedly mounting said stator and movably supporting said first and second oscillators in such a manner as to allow them to move respectively in parallel linear paths; said electromagnet including a winding receiving a drive current to generate a magnetic field which interacts with the permanent magnet to cause said oscillators to reciprocate relative to said stator respectively in the parallel linear paths;
a first drive element integrally projecting from said first oscillator and being adapted to be connected to a first reciprocating load for driving the same, wherein said first drive element, said first oscillator, and said first reciprocating load have a first mass center; and
a second drive element integrally projecting from said second oscillator and being adapted to be connected to a second reciprocating load for driving the same, wherein said second drive element, said second oscillator, and said second reciprocating load have a second mass center;
wherein said first mass center and said second mass center are substantially aligned with a center line of said linear oscillating actuator.

* * * * *